(12) United States Patent
Landskron et al.

(10) Patent No.: US 7,824,641 B2
(45) Date of Patent: Nov. 2, 2010

(54) PERIODIC MESOPOROUS PHOSPHORUS-NITROGEN COMPOUNDS

(75) Inventors: Kai Landskron, Bethlehem, PA (US); Paritosh Mohanty, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 0 days.

(21) Appl. No.: 12/126,379

(22) Filed: May 23, 2008

(65) Prior Publication Data

US 2008/0292521 A1 Nov. 27, 2008

Related U.S. Application Data

(60) Provisional application No. 60/940,181, filed on May 25, 2007.

(51) Int. Cl.
*C01B 21/082* (2006.01)
*C01B 21/087* (2006.01)
*C01B 21/097* (2006.01)

(52) U.S. Cl. ............... 423/302; 423/304; 423/385; 423/406; 423/413

(58) Field of Classification Search ............ 423/302, 423/385, 406, 413, 304; 501/80
See application file for complete search history.

(56) References Cited

U.S. PATENT DOCUMENTS

| | | | |
|---|---|---|---|
| 3,931,039 A | 1/1976 | Yamashita et al. | |
| 3,964,812 A | 6/1976 | Turnbull | |
| 3,972,838 A | 8/1976 | Yamashita et al. | |
| 4,025,464 A | 5/1977 | Yamashita et al. | |
| 4,741,971 A | 5/1988 | Beck et al. | |
| 4,766,229 A | 8/1988 | Kobayashi et al. | |
| 5,370,853 A | 12/1994 | Schnick et al. | |
| 5,580,921 A | 12/1996 | Stepp et al. | |
| 6,475,663 B1 | 11/2002 | Mohwald et al. | |
| 6,746,803 B1 | 6/2004 | Bauer et al. | |
| 6,932,959 B2 * | 8/2005 | Sterte et al. | 423/716 |
| 7,071,139 B2 * | 7/2006 | Gole | 502/200 |
| 7,186,460 B2 | 3/2007 | Winkler et al. | |

(Continued)

OTHER PUBLICATIONS

Kim et al, "Phosphazenium chloride catalysts immobilized on SBA-15 mesoporous material and silica gel: new exceptionally active catalysts for the chlorination of organic acids." Chemical Communications, 2003, pp. 372-373.*

(Continued)

*Primary Examiner*—George Wyszomierski
*Assistant Examiner*—Brian Walck
(74) *Attorney, Agent, or Firm*—Pepper Hamilton LLP

(57) ABSTRACT

Provided herein is a new material, periodic mesoporous phosphorus-nitrogen compound, which may be used in a variety of emerging technologies. Its surface properties render it promising as a component in a variety of applications, including gas separation and purification systems in which waste gases such as $SO_2$, $SO_3$, or $CO_2$ are separated from other gases. It may also be used as an interlayer dielectric in microelectronic chips. Its structure and composition are useful due to an advantageous and favorable combination of thermal stability, elastic modulus, and dielectric properties. The surface properties and the regularity of the pores furthermore provides utility as shape selective base catalysts. Protonated forms of the material are expected to be useful as a solid acid, and in applications such as acid catalysis. Additionally, because of the thermal behavior of the material, it is useful as "hard" template for other porous materials, without the need of an external reagent.

17 Claims, 5 Drawing Sheets

U.S. PATENT DOCUMENTS

| | | |
|---|---|---|
| 7,241,502 B2 | 7/2007 | Anselmann et al. |
| 7,291,394 B2 | 11/2007 | Winkler et al. |
| 2004/0035751 A1* | 2/2004 | Plee .......................... 208/113 |

OTHER PUBLICATIONS

Wang et al. "Hexagonally ordered mesoporous phosphates oxynitrides." Microporous and Mesoporous Materials 107, pp. 233-239. Available online Mar. 14, 2007.*

Q. Guo et al., Large-Scale Synthesis of Amorphous Phosphorus Nitride Imide Nanotubes with High Luminescent Properties, J. Mater. Res, Feb. 2005, 325-330, vol. 20, No. 2, Materials Research Society.

F. Kleitz et al., Phase Domain of the Cubic Im3m Mesoporous Silica in the EO106PO70EO106-Butanol-H20 System, Langmuir, 2006, 440-445, vol. 22, No. 1, American Chemical Society.

B. Hatton et al., Materials Chemistry for Low-k Materials, Materials Today, Mar. 2006, 22-31, vol. 9, No. 3, Elsevier Ltd.

P. Dibandjo et al., Synthesis of Boron Nitride with a Cubic Mesostructure, Microporous and Mesoporous Materials, 92, 2006, 286-291, Elsevier Inc.

G. Attard et al., Liquid Crystal Phase Templated Mesoporous Platinum Alloy, Microporous and Mesoporous Materials, 44-45, 2001, 154-163, Elsevier Science B.V.

M. MacLachlan et al., Non-Aqueous Supramolecular Assembly of Mesostructured Metal Germanium Sulphides from (Ge4S10)4-Clusters, Nature, Feb. 1999, 681-684, vol. 397, Macmillan Magazines Ltd.

G. Armatas et al., Hexagonal Mesopurous Germanium, Science, Aug. 2006, 817-820, vol. 313, www.sciencemag.org.

K. Landskron et al., Multianvil Synthesis, X-ray Powder Diffraction Analysis, 31P-MAS-NMR, and FTIR Spektroscopy as well as Material Properties of γ-P3N5, a High-Pressure Polymorph of Binary Phosphorus(V) Nitride, Built up from Distorted PN5 Square Pyramids and PN4 Tetrahedra, Z. Anorg. Allg. Chem., 2002, 1465-1471, vol. 628, Wiley-VCH.

A. Lu et al., Nanocasting: A Versatile Strategy for Creating Nanostructured Porous Materials, Adv. Mater, 2006, 1793-1805, vol. 18, Wiley-VCH.

P. Dibandjo et al., Comparison Between SBA-15 Silica and CMK-3 Carbon Nanocasting for Mesoporous Boron Nitride Synthesis, J. Mater Chem., 2005, 1917-1923, vol. 15, The Royal Society of Chemistry.

T. Kim et al., Tailoring the Pore Structure of SBA-16 Silica Molecular Sieve Through the Use of Copolymer Blends and Control of Synthesis Temperature and Time, J. Phys. Chem. B, 2004, 11480-11489, vol. 108, American Chemical Society.

S. Jun et al., Synthesis of New, Nanoporous Carbon with Hexagonally Ordered Mesostructure, J. Am. Chem. Soc., 2000, 10712-10713, vol. 122, American Chemical Society.

Y. Hirota et al., Chemical Vapor Deposition and CHaracterization of Phosphorus-Nitride (P3N5) Gate Insulators for InP Metal-Insulator-Semiconductor Devices, J. Appl. Phys. Jul. 1982, 5037-5043, vol. 53, No. 7, American Institute of Physics.

T. Kim et al, Characterization of Mesoporous Carbons Synthesized with SBA-16 Silica Template, J. Mater. Chem., 2005, 1560-1571, vol. 15, The Royal Society of Chemistry.

P. Dibandjo et al., Synthesis of Boron Nitride with Ordered Mesostructure, Adv. Mater., 2005, 571-574, vol. 17, No. 5, Wiley-VCH.

F. Goettmann et al., Metal-Free Activation of CO2 by Mesoporous Graphite Carbon Nitride, Angew. Chem. Int. Ed., 2007, 2717-2720, vol. 46, Wiley-VCH.

S. Horstmann et al., Synthesis and Crystal Structure of Phosphorus(V) Nitride x-P3N5, Angew. Chem. Int. Ed. Engl., 1997, 1873-1875, vol. 36, No. 17, Wiley-VCH.

M. Markham et al., Birefringent Cadmium-Telluride-Based Metamaterial, Applied Physics Letters, 2005, 011912, vol. 86, American Institute of Physics.

Z. Meng et al., Microtubes and Balls of Amorphous Phosphorus Nitride Imide (HPN2) Prepared by a Benzene-Thermal Method, Chem. Commun., 2001, 469-470, The Royal Society of Chemistry.

W. Schnick et al., Phosphorus Nitride P3N5: Synthesis, Spectroscopic, and Electron Microscopic Investigations, Chem. Mater., 1996, 281-286, vol. 8, American Chemical Society.

S. Kaskel et al., Synthesis, Characterization, and Catalytic Properties of High-Surface-Area Aluminum Silicon Nitride Based Materials, Chem. Mater., 2005, 181-185, vol. 17, American Chemical Society.

Z. Meng, et al., Synthesis and Characterization of Amorphous Phosphorus Nitride, Chemistry Letters, 2000, 1252-1253, The Chemical Society of Japan.

S. Levchik et al., Phosphorus Oxynitride: A Thermally Stable Fire Retardant Additive for Polyamide 6 and Poly (butylene terephthalate), Die Angewandte Makromolekulare Chemie, 1999, 48-55, vol. 264, Wiley-VCH.

M. Kaperman et al., Ordered Mesoporous Ceramics Stable up to 1500 C from Diblock Copolymer Mesophases, J. Am. Chem. Soc., 2004, 14708-14709, vol. 126, American Chemical Society.

D. Zhao et al., Triblock Copolymer Syntheses of Mesoporous Silica with Periodic 50 to 300 Angstrom Pores, Science, Jan. 1998, 548-552, vol. 279, www.sciencemag.org.

C. Kresge et al., Ordered Mesoporous Molecular Sieves Synthesized by a Liquid-Crystal Template Mechanism, Nature, Oct. 1992, 710-712, vol. 359, Nature Publishing Group.

"amide" and "imide" as defined in "IUPAC Recommendations on the Nomenclature of Inorganic Chemistry," in Inorganic Chemistry: Principles of Structure and Reactivity, 4th Ed., by Huheey et al., pp. 53, 57 (1993, HarperCollins).

"oxy" as defined in Nomenclature of Inorganic Chemistry, IUPAC Recommendations 2005, pp. 121, 256 (2005, International Union of Pure and Applied Chemistry).

* cited by examiner

PERIODIC MESOPOROUS PHOSPHORUS-NITROGEN COMPOUNDS

CROSS-REFERENCE TO RELATED APPLICATIONS

This application claims the priority of application No. 60/940,181, filed May 25, 2007, the entire contents of which are incorporated herein by reference.

FIELD

Periodic mesoporous phosphorus-nitrogen compounds, related compounds, compositions thereof, uses thereof, and methods of manufacture thereof.

BACKGROUND

The vast majority of knowledge about inorganic periodic mesoporous materials is concerned with oxidic ceramics. See, e.g. Kresge, et al., Nature 359, 710-12 (1992); Zhao, et al., Science 279, 548-52 (1998). A major reason for this seems to be that surfactant templated assembly in aqueous media is very suitable for the preparation of periodic mesoporous oxides, but far less suitable for the synthesis of non-oxidic compounds. The synthesis of non-oxidic mesoporous ceramics usually requires non-aqueous conditions. Therefore, only a few systems are accessible via surfactant templating routes. See, e.g. Maclachlan, et al., Nature 397, 681-84 (1999); Armatas, et al., Science 313, 817-20 (2006); Kamperman, et al., J. Amer. Chem. Soc. 126, 14708-09 (2004); Attard, et al., Microporous Mesoporous Mater. 44-45, 159-63 (2001); Markham, et al., Appl. Phys. Lett. 86, 011912/1-011912/3 (2005).

Unlike the corresponding mesoporous oxides, very little is known about non-oxidic periodic mesoporous ceramics. The stability of a mesoporous framework strongly depends on the framework connectivity and the bond strengths between the constituting elements. Many non-oxidic ceramics like nitrides, carbides, borides, and phosphides have higher framework connectivities than their corresponding oxides because they can make more bonds to their neighbors in comparison to oxygen. For example, C makes four bonds to neighbor atoms in carbides while oxygen makes only two bonds in oxidic ceramics. Furthermore, the bond strengths in non-oxidic ceramics are often nearly as high as in oxides.

In their dense forms, many non-oxidic ceramics exhibit a much greater thermal stability than their corresponding oxides, and the mesoporous forms may therefore have superior thermal properties in comparison with similar oxides. This has been impressively demonstrated in the case of the Si—B—C—N ceramic prepared by Wiesner. See, Kamperman, op cit. However, porous frameworks have a tendency to convert into a more dense form upon heating. Thus, it is desirable to synthesize new mesoporous frameworks, particularly non-oxidic ceramics, with excellent thermal stabilities.

Many non-oxidic ceramics in their dense forms also exhibit much greater hardness and elastic modulus than their corresponding oxides. In fact, the hardest substances known are non-oxidic ceramics (diamond, c-BN, SiC, $Si_3N_4$). Increasing the porosity in a material leads inherently to lower mechanical strength, which can dramatically reduce the practical utility of a porous material. A striking example is low dielectric constant materials for microelectronics. The development of new low-dielectric constant materials is one of the most important problems in microelectronics today, yet it is hampered largely by the low elastic modulus of the porous materials available so far. All materials under investigation so far fail to meet the minimum elastic modulus (6 GPa) at porosities necessary to achieve k values of <1.9. See, e.g. Hatton, et al., Mater. Today 9, 22-31 (2006). Furthermore, the elastic modulus is reduced with increasing porosity in any material. Thus, it is desirable to prepare new mesoporous materials with high porosity and high elastic moduli and hardness.

SUMMARY

Periodic mesoporous phosphorus-nitrogen compounds and related compounds as described herein are useful in a variety of emerging technologies. Their surface properties render them useful as components in gas separation and purification systems that employ reversible adsorption and desorption of Lewis acidic gases techniques in which waste gases such as $SO_2$, $SO_3$, or $CO_2$ are separated from other gases. Gas separation of such Lewis acidic gases are of importance in addressing energy and environmental problems associated with these gases. They are also useful as an interlayer dielectric in microelectronic chips. Their structures and compositions provide advantageous and favorable combinations of thermal stability, elastic modulus, and dielectric properties. Their surface properties and the regularity of the pores also provide utility as shape selective base catalysts. These materials are archetypal of a new class of solids that have industrial application in heterogeneous base catalysis. Additionally, protonated forms of these materials may be used as solid acids, e.g. in heterogeneous acid catalysis.

Because of the thermal behavior of these materials, they can be used as "hard" templates for other porous materials without the need of an external reagent. Removal of these materials will not require an external reagent, which makes the process simpler and potentially cheaper, while permitting access to new classes of porous materials not accessible by other routes. Moreover the possibility that an external reagent harms the product is eliminated. Accordingly, the preparation of new mesoporous materials that are difficult to obtain with conventional methods is made possible. Furthermore, improved methods for etching to remove silica templates is also provided. With such etching methods, higher etching selectivity is achieved, and a product with better uniformity and periodicity of mesopores is produced. The methods are generally applicable and may be applied to the synthesis of a variety of mesoporous materials. Also described herein are melt-infiltration techniques for nitridic materials, which is highly efficient for the synthesis of nitridic periodic mesoporous materials. Such methods provide significant advantages over solution infiltrations so far used for the preparation of mesoporous nitridic materials with periodic mesopores because no solvent needs to be present and the precursor does not compete with the solvent for the pore.

Advantages over the only known nitridic high surface area material with periodic mesopores (i.e., boron nitride) include the presence of an electron lone pairs on nitrogen atoms, which provides enhanced Lewis base characteristics. Furthermore, in comparison to high surface area nitrides having disordered mesopores, the new materials described herein have periodic mesopores, shape selectivity, and improved adsorption-desorption properties, as well as better defined mass transport properties. Furthermore, phosphorus-nitrogen compounds offer an advantageous combination of high mechanical strength, high thermal stability, and low dielectric constant.

Additional features may be understood by referring to the accompanying Drawings, which should be read in conjunction with the following detailed description and Examples.

DETAILED DESCRIPTION AND EXEMPLARY EMBODIMENTS

Figures 1A, 1B:
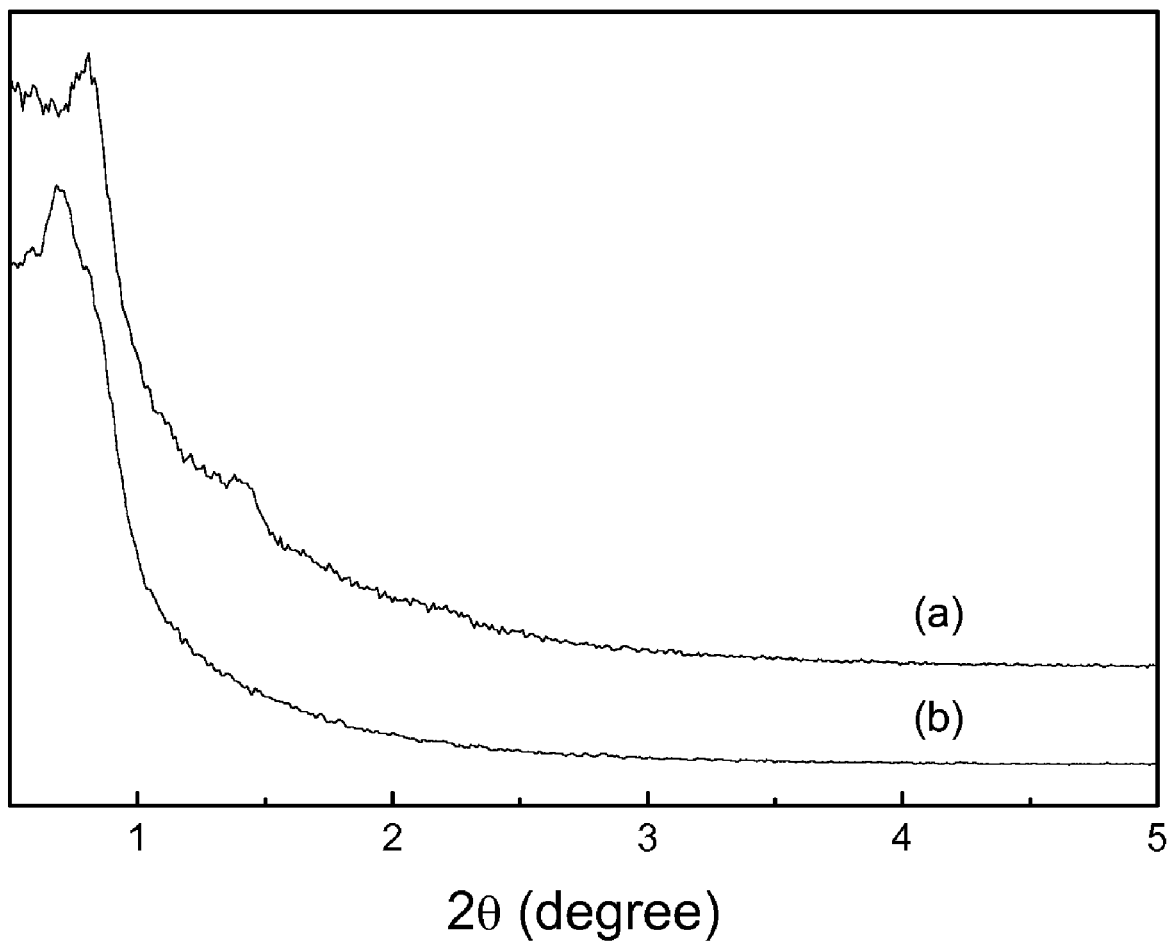
FIGS. 1a-1d schematically illustrates XRD patterns (a) and (b) and TEM images (c) and (d) of PON-1 and PON-2, respectively, in accordance with an example embodiment hereof.

Nanocasting is a technique that has recently been introduced as an alternative to surfactant directed "soft" assembly. Lu, et al., Adv. Mater. 18, 1793-805 (2006). A periodic mesoporous framework is used as so-called "hard template" producing a negative replica of the hard template structure. A molecular precursor is infiltrated into the pores of the hard template and subsequently polymerized within the pores of the hard template at elevated temperatures. Then the hard template is removed by a suitable method. This nanocasting route is appealing because no cooperative assembly processes between the template and the ceramic precursors are needed. Moreover, nanocasting can be performed fairly easily in non-aqueous media. The only hard templates that have been used so far are mesoporous silica and mesoporous carbon. Mesoporous silica can be inverted to form mesoporous carbon by infiltration of organic precursors like sugar into the pores, heat treatment of the composite material, and subsequent selective etching, such as by exposure to HF, NaOH or other suitable etching solvents and chemicals.

Periodic mesoporous carbon allowed for the synthesis of a number of periodic mesoporous oxidic materials because the carbon template can be removed by oxygen at modest temperatures (400-500° C.). Under these conditions, the carbon reacts selectively with oxygen under maintenance of the mesostructure of the oxidic ceramic. It has been shown that carbon templates also react with $NH_3$, however, temperatures above 1000° C. are needed. Dibandjo, et al., Adv. Mater. 17, 571-74 (2005); Dibandjo, et al., Microporous Mesoporous Mater. 92, 286-91 (2006); Dibandjo, et al., J. Mater. Chem. 15, 1917-23 (2005). A boron nitride with periodic mesopores has been synthesized this way, which is the only nitridic material with periodic mesopores that has been made so far by nanocasting. The same group also produced mesoporous boron nitride from silica templates, but in this case the pores were not ordered (i.e., periodic).

Phosphorus(V)-nitrogen frameworks have a modestly high thermal stability in their dense forms (ca. 800° C.). Above this point they decompose into gaseous PN and $N_2$ molecules. This makes periodic mesoporous P—N compounds useful as hard template for other ceramic materials because its removal would not require an external reagent. They are simply be removed by heating. At the decomposition temperature of phosphorus(V)-nitrogen frameworks many other ceramic materials are still stable. At this temperature a ceramic inside the pores of a phosphorus(V)-nitrogen compound could stay unreactive towards it because of the covalent inert P—N bonds. On the other hand, the decomposition point of a phosphorus(V)-nitrogen framework is high enough that the ceramic material that has formed in its pores from a precursor in a thermally directed polymerization process has already a sufficiently high framework connectivity preventing the collapse of the porous structure upon template decomposition.

Described herein is the first example of a periodic mesoporous phosphorus nitrogen compound, which was obtained in a nanocasting process employing mesoporous silica templates. The material shows a high degree of mesostructural periodicity and high surface area. The lone pairs of electrons at N in amine molecules are strong Lewis and Brønsted bases. In phosphorus(V)-nitrides, N can carry formally a negative charge counterbalancing the five positive charges at P in the $PN_4$ building units, and thus it could be basic. See, e.g. Horstmann, et al., Angew. Chem. Int. Ed. 36, 1873-75 (1997).

Two other interesting properties of the phosphorus(V)-nitride compound $P_3N_5$ in its dense form are its low dielectric constant and its hardness. See, e.g. Hirota, et al., J. Appl. Phys. 53, 5037-43 (1982); Landskron, et al., Zeitschrift für Anorganische und Allgemeine Chemie 628, 1465-71 (2002). Furthermore, $P_3N_5$ shows a hardness greater than $SiO_2$ glasses. The k value of $P_3N_5$ is 3.7, which is lower than the respective value for dense silicon dioxide (4.5). This is even more remarkable considering that $P_3N_5$ has a higher framework connectivity than silicon dioxide.

Described herein are the first examples of a mesoporous phosphorus-nitrogen compounds. They were prepared using hexagonal and cubic mesoporous silicas SBA-15 and SBA-16 as a hard template using a direct melt infiltration technique. This is the first successful synthesis of an inorganic nitridic compound with periodic mesopores made directly from a mesoporous silica. Moreover, melt-infiltration techniques have be successfully employed to the synthesis of nitridic materials with periodic mesopores.

The synthesis of periodic mesoporous hexagonal (p6mm) and cubic (Im3̄m) phosphous-nitrogen compound ("PON") designated as PON-1 and PON-2 has been achieved using mesoporous silicas as hard templates. The synthesis was performed by a direct melt-infiltration of the phosphonitrilic chloride trimer $(PNCl_2)_3$ (also referred to as "PNC" herein) as the PON source into the mesoporous SBA-15 and SBA-16 silicas. In principle, other phosphorus(V) sources could be used, such as $PCl_5$, tetraminophosphonium salts, or hexaminodiphosphazeneium salts. Alternatively, reduced phosphorus sources, such as $PCl_3$ or even elemental phosphorus, can be used in the presence of a nitrogen oxidant. SBA-15 and SBA-16 silicas were prepared following the procedures described in the following references: Jun, et al., J. Am. Chem. Soc. 122, 10712-13 (2000); Kim, et al., J. Phys. Chem. B 108, 11480-89 (2004); Kim, et al., J. Mater. Chem. 15, 1560-71 (2005); Kleitz, et al., Langmuir 22, 440-45 (2006).

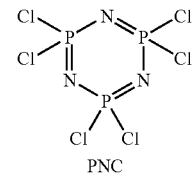

PNC

In the examples herein, typically, 2 g of PNC was molten at 120° C. in nitrogen atmosphere and infiltrated into 1 gram of the silicas under stirring. Prior to the infiltration the silicas were kept overnight at 150° C. in vacuum. The resulting PNC-$SiO_2$ was kept in a closed bottle in an oven at 120° C. for another 24 hours under $N_2$. Removal of the excess PNC from the outside of the silica particles was carried out by heating the PNC-$SiO_2$ composites at 120° C. in a tube furnace with flowing nitrogen for 1 h. By this technique, the capillary forces keep the infiltrated PNC inside the pores, while PNC that is deposited outside of the pores gets transported outside of the heating zone by the nitrogen stream. Subsequently, the temperature of the furnace was raised to 700° C. with a heating rate of 10° C./min and kept at 700° C. for 20 minutes. This heat treatment was done in an ammonia atmosphere to nitridize the PNC to form the PON-$SiO_2$ composites under the elimination of $NH_4Cl$. Despite the high ion diffusion rates that one might expect under such high-temperature conditions, the mesostructure was retained with only very minor decrease of order, which can be explained by the rather short reaction time of only about 20 minutes at 700° C. To support this interpretation of the findings, the inventors carried out the reaction also for 1 hour at this temperature. Indeed, the inventors found complete loss of mesoscale periodicity at this prolonged reaction time. Shorter reaction times than 20 minutes did not lead to a further increase of order.

The silica template was removed by stirring the PON-$SiO_2$ composites with a solution of 1.4 ml 48-50 wt % aqueous HF in 40 mL acetone for 1 hour. The EDX analysis of the so-prepared PON-1 and PON-2 samples showed that Si was practically completely absent. This shows that the siliceous part can be highly selectively etched, even though P(V) and Si(IV) have both a high affinity to fluoride. This finding may be due to the highly covalent inert character of the P—N bonds relative to the comparatively ionic labile character of Si—O bonds. The presence of acetone was desirable to maintain mesoscale periodicity inasmuch as removal of the silica template using only aqueous HF solutions of various concentrations may result in loss of mesoscale periodicity.

Figure 1C:
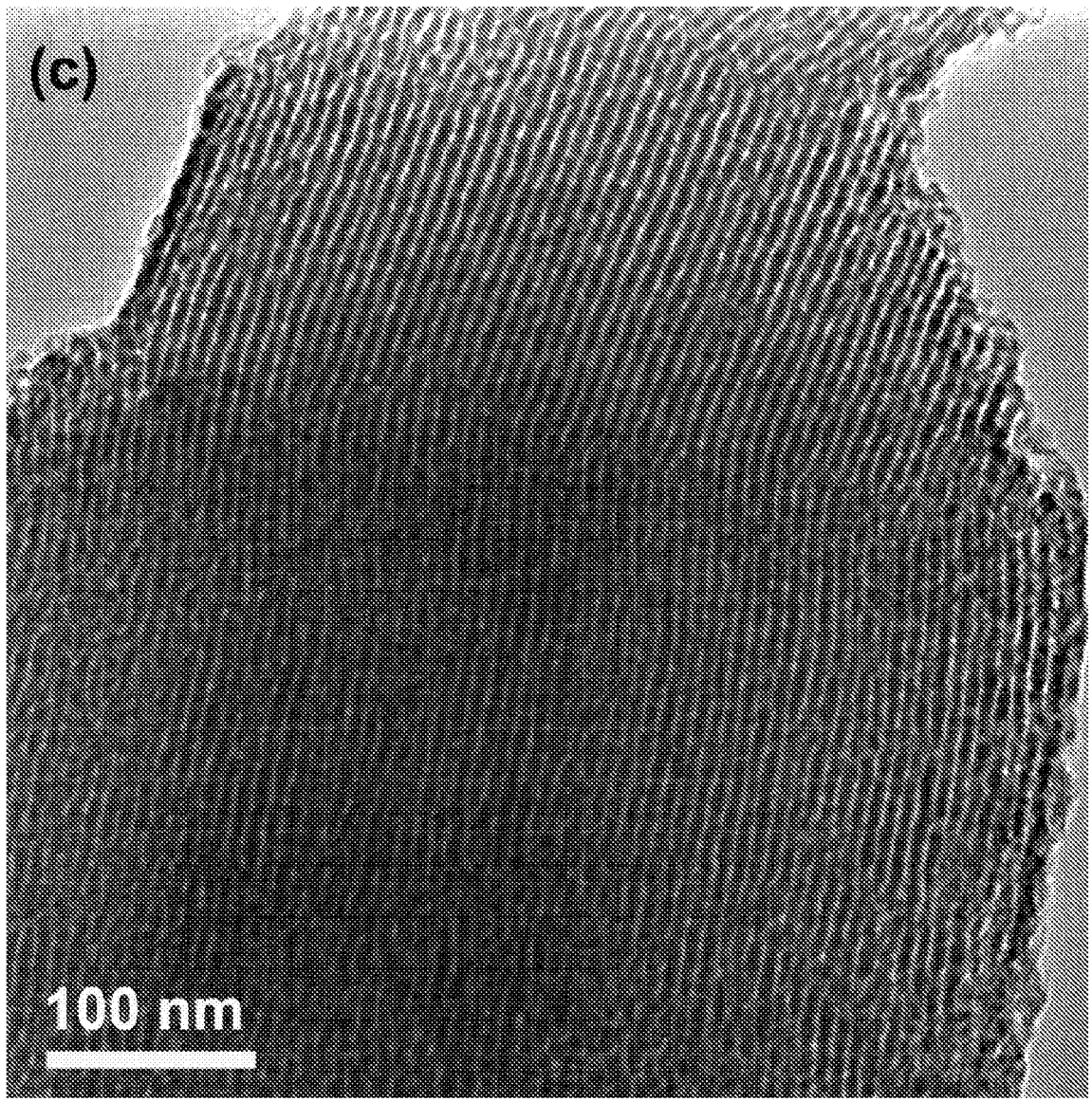

Referring to the attached Drawings, FIGS. 1a and b show the small angle X-ray diffraction (XRD) patterns of PON-1 and PON-2, respectively, demonstrating the well-ordered structure of the specimens. An intense diffraction peak with d=10.9 nm and two weak peaks at 6.3 and 5.4 nm were observed for the PON-1. These peaks can be assigned to the (100), (110) and (200) reflections of the p6mm hexagonal phase with a lattice parameter a=12.6 nm, similar to SBA-15. This hexagonal symmetry is further confirmed by the TEM image (FIG. 1c), which shows the structure of the PON-1 is exactly the inverse replica of the SBA-15 original. The PON-1 pore walls are 5.5 nm in diameter having a periodicity of 8 nm. The lattice parameter estimated from the TEM analysis is approximately 9.2 nm, which is consistent with the calculated value from XRD.

Figure 1D:
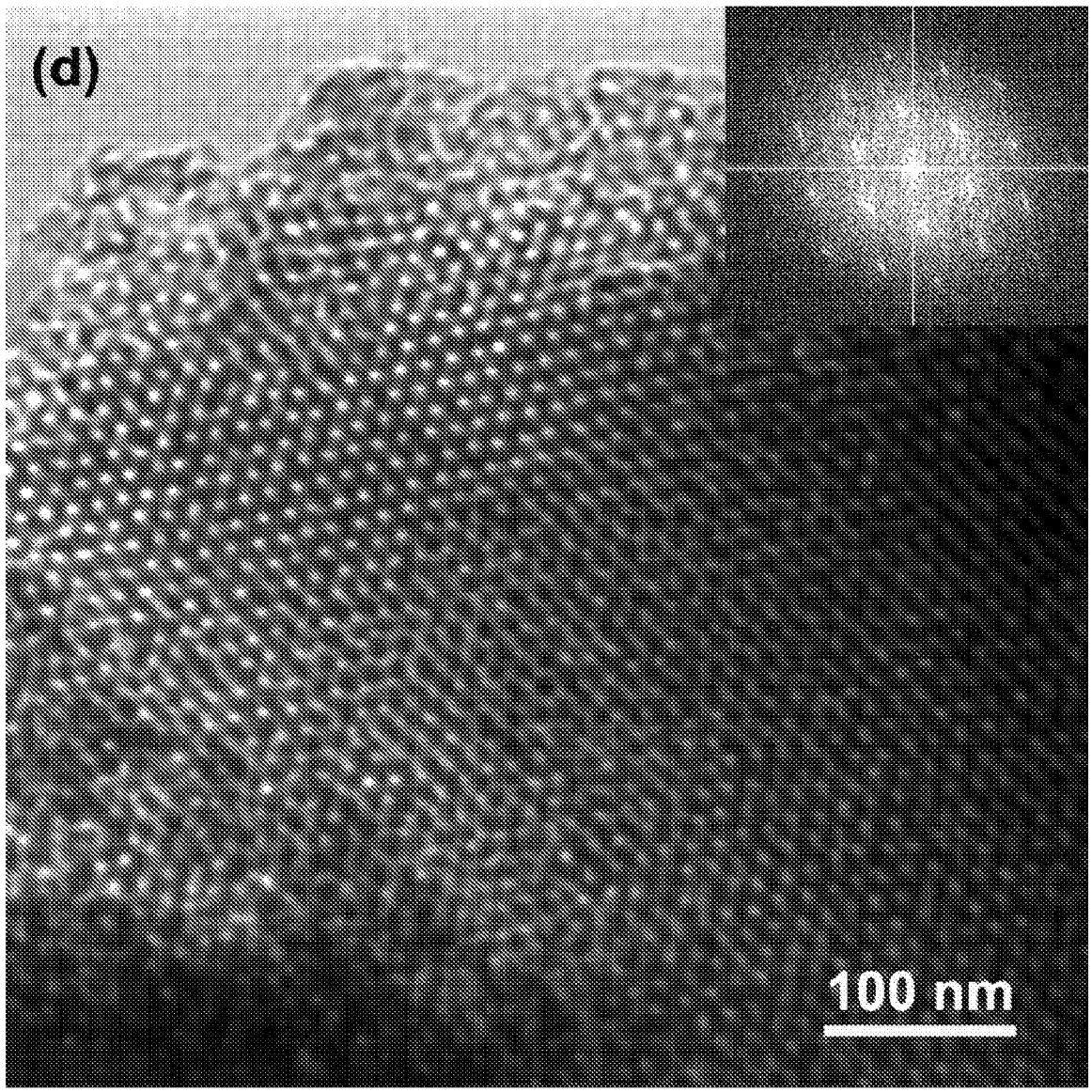

The XRD pattern of the PON-2 (FIG. 1b) shows an intense peak with the d spacing of 12.9 nm and the lattice parameter a of 18.2 nm, which can be indexed to the (011) reflection of Im$\bar{3}$m body centered cubic (bcc) structure. The higher order peaks in this diffractogram are not clearly visible. However, these higher order peaks can be seen in the parent silica SBA-16. The Im$\bar{3}$m bcc structure of the PON-2 was confirmed with the TEM and Fourier transform (FFT) images (FIG. 1d). FIG. 1d shows the TEM image corresponding to the [111] projection and the FFT image is given in the inset to FIG. 1d. Both the TEM and the FFT images correspond well to those for SBA-16 with Im$\bar{3}$m symmetry. Absence of diffraction peaks in the wide angle XRD patterns (data not shown) demonstrated both the PON-1 and PON-2 channel walls were amorphous in nature.

Figure 2:
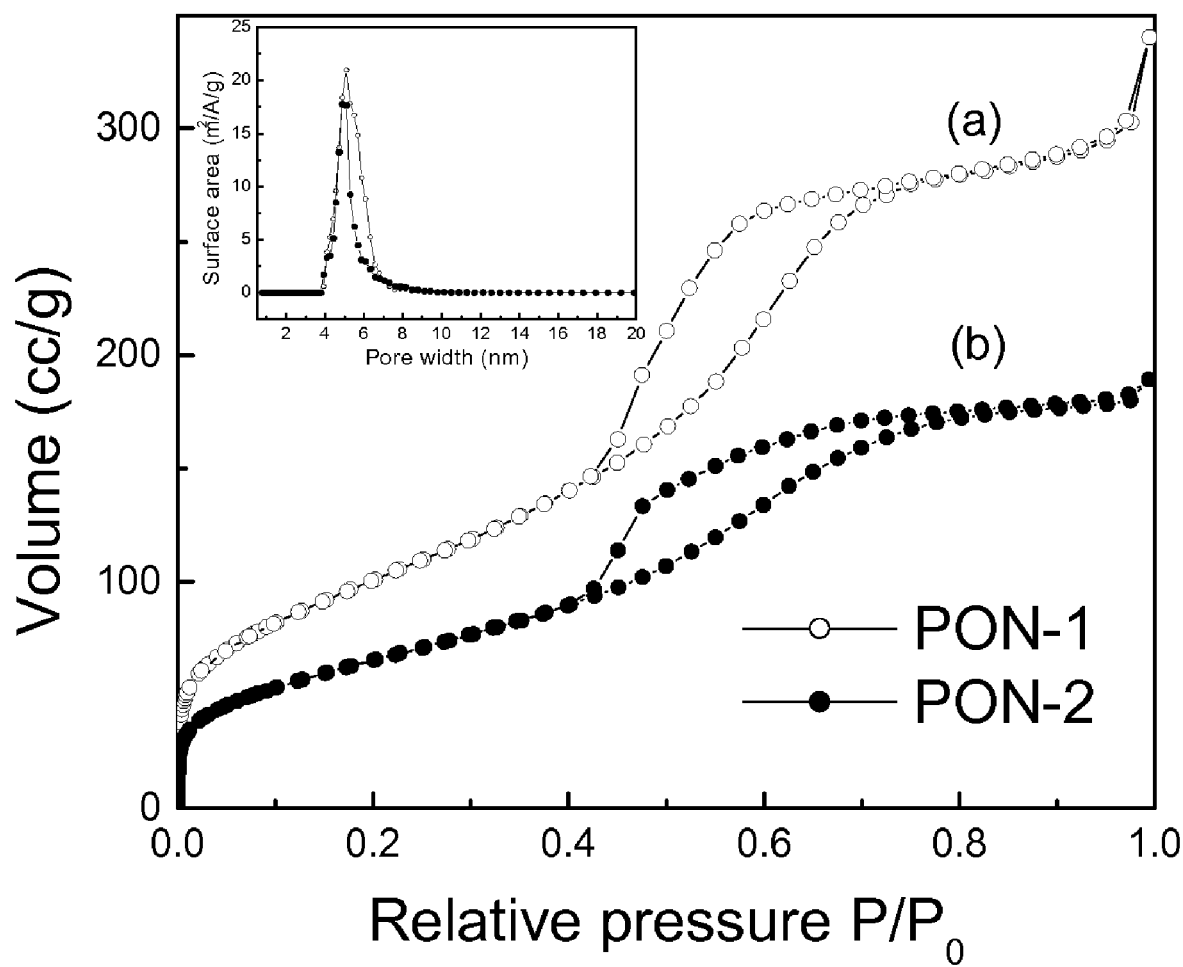
FIG. 2 includes data for $N_2$ adsorption-desorption measured at −196° C. for (a) PON-1 and (b) PON-2. The pore size distribution (calculated by a DTF & Monte-Carlo method) is given in the inset.

The $N_2$ sorption isotherm (FIG. 2a) of the PON-1 shows a type-IV isotherm with a sharp capillary condensation at $P/P_0$=0.45 to 0.7, which indicates that the material has uniform mesoporous channels. The BET surface area and the total pore volumes are calculated to be 380 $m^2g^{-1}$ and 0.53 $cm^3g^{-1}$, respectively. A DFT & Monte-Carlo analysis showed narrow pore size distribution ("PSD") with the average pore width of 5.0 nm, compared to 8.4 nm for the parent SBA-15. The pore width of PON-1 determined from the $N_2$ sorption measurement is consistent with the value obtained from the TEM analysis. The PON-2 shows a type-IV isotherm with a BET surface area of 244 $m^2g^{-1}$, and total pore volume of 0.29 $cm^3g^{-1}$ with the average pore width of 4.9 nm calculated by DFT (Density Functional Theory) & Monte-Carlo analysis.

The composition of PON-1 was investigated in detail by elemental analysis. To ensure complete water desorption, the sample was heated to a temperature of 450° C. in order to ensure removal of adsorbed water. The inventors tested not only for P and N, but also for O, H, and C because of the possibility of surface hydrolysis during the etching step, O/N interdiffusion during synthesis, and chemisorption of acetone. The composition was found to be $PN_{1.4}O_{0.88}H_{1.28}Si_{0.02}C_{0.15}$. The sum of elements was found to be 99.93 wt %, showing that practically no other elements were overlooked. The investigations confirmed that Si is nearly absent even though some N/O interdiffusion had apparently occurred at the mesoscopic oxide/nitride interface which incorporates some oxide ions into the P—N framework. The presence of C may be explained by incidental reaction of a small amount of acetone with the material's surface.

Figure 3:
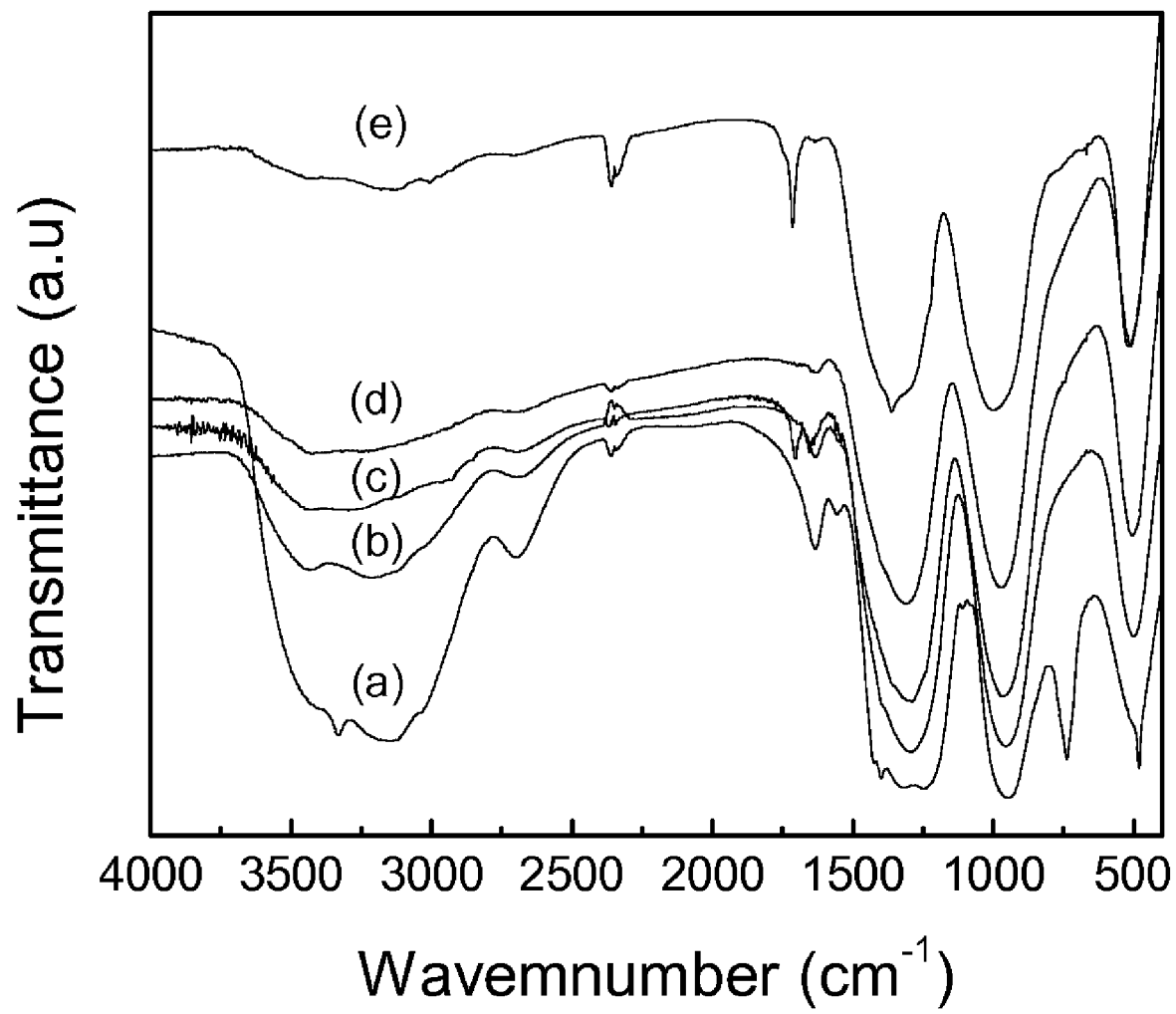
FIG. 3 includes FTIR spectra of (a) as-synthesized PON-1, and PON-1 heated at (b) 350, (c) 450, (d) 550 and (e) 650° C. for 1 h in $N_2$ atmosphere.

The results also indicate that P—OH and P—N—H units may be present. In order to investigate this in more detail, the PON-1 sample was heated to various temperatures and studied by FTIR spectroscopy. FIG. 3 shows the FTIR spectra of PON-1 samples exposed to various temperatures (RT, 350, 450, 550, and 600° C.). Three broad bands appear in all of these samples in the 400 to 1600 $cm^{-1}$ range. Very similar bands appear in bulk phosphorus nitrides, nitride imides, and oxynitrides corroborating the results from elemental analysis. See, e.g. Schnick, et al., Chem. Mater. 8, 281-86 (1996); Meng, et al., Chem. Lett. 1252 (2000); Guo, et al., Mater. Res. 20, 325-30 (2005); Meng, et al., Chem. Commun. 469-70 (2001); Levchik, et al., Die Angew. Makromole. Chem. 264, 48-55 (1999). The bands at around 500, 950, and 1300 $cm^{-1}$ are attributed to P=N—P bending vibration, P—NH—P stretching vibration, and P=N—P stretching vibration, respectively. The broad band around 3200 $cm^{-1}$ indicates the presence of the NH groups in the sample.

In addition to these bands, a band appears at 1400 $cm^{-1}$ in the as-synthesized PON-1 that is absent in all other heated samples. The band indicates the presence of some residual $NH_4^+$, which may be a result of some minor pore surface hydrolysis during the etching step. The appearance of the small peaks at 1636 and 3435 $cm^{-1}$, respectively, correspond well to O—H bending and O—H stretching vibrations of $H_2O$. These peaks strongly decrease in intensity, however, for the heat-treated samples (b)-(e), and therefore the bands at 3400-3700 $cm^{-1}$ are not primarily due to adsorbed water, but due to P—OH groups that overlap with bands of NH groups that typically have resonance frequencies around 3200 $cm^{-1}$. They also explain the rather high H content found in the elemental analysis. The relative intensity of the bands is decreasing with increasing temperature indicating a continuous condensation of the PON framework at higher temperatures. Accordingly, the material is a periodic mesoporous phosphorus-nitrogen compound.

In order to study how the order of the mesostructure would behave at elevated temperatures, the small angle XRD patterns of the PON-1 heated at 350, 450, 550, and 600° C. for 1 h in $N_2$ atmosphere were studied. From the XRD patters, it can be clearly seen that the periodicity of mesostructure remains up to a temperature of 550° C. but vanishes on heating to a higher temperature as high as 600° C.

Accordingly, the inventors have successfully synthesized hexagonal and cubic periodic mesoporous phosphorus-nitrogen compound by direct melt infiltration of phosphonitrilic chloride into the pores of mesoporous silica. A novel etching process was utilized in this work to produce high order in the mesostructure. The synthesized PON-1 and PON-2 are expected to be useful in a variety of applications such as catalysis, microelectronics, gas adsorption, purification and separation media, and as new template. For example, the lone electron pairs of high surface area nitrides can be strong bases, and therefore they can be useful as heterogeneous base catalysts. See, e.g. Kaskel, et al., Chem. Mater. 17, 181-85 (2005). High surface area nitrides have also shown to active otherwise inert organic molecules such as benzene. See e.g. Goettmann, et al., Angew. Chem. Int. Ed. 46, 2717-20 (2007). The basic sites at the surface may also be excellent adsorption sites for Lewis acidic gases, such as waste gases like $CO_2$ or $SO_3$. Thus, they may be of interest in gas purification and separation systems. This includes $CO_2$ capture from waste gases from combustion of fossil fuels in electricity generation plants.

Hexagonal and cubic periodic mesoporous phosphorus-nitrogen compounds made by direct melt infiltration of phosphonitrilic chloride into the pores of mesoporous silica represents the first nitridic material of an element of the $3^{rd}$ or higher period of the periodic table of the elements having periodic mesopores, as well as the first periodic mesoporous nitridic material with electron lone pairs at N. It was also heretofore unknown that an inorganic material could be used as a hard mesogenic template without the need of an external reagent to remove it. Likewise, the novel porous nitridic materials as described herein have a high thermal stability (550° C.). They suggest a low dielectric constant, and a high elastic modulus. Furthermore, melt infiltration applied to periodic mesoporous nitridic materials is novel.

As used herein, the term "mesopores" or "mesoporous" refers to a material having pores (as opposed to "dense," non-porous materials) with an average size of from about 2 nm to about 50 nm. Also as used herein, the term "periodic" refers to a material having translational symmetry in at least two directions, and preferably in all possible directions. As used herein, the term nitridic materials comprises materials with $N^{3-}$, $NH^{2-}$, and $NH_2^-$ units. As used herein, "min" herein refers to minutes, and "h" refers to hours.

Accordingly, in an embodiment, a novel composition as provided herein includes at least one mesoporous phosphorus-nitrogen compound. The at least one mesoporous phosphorus-nitrogen may include mesoporous nitrides, imides, and amides of phosphorus(V). Likewise, the mesoporous phosphorus-nitrogen compound may include at least one additional element, such as oxygen, sulfur, or carbon.

In another embodiment, a mesoporous phosphorus-nitrogen compound is characterized by mesopores having an average size of from about 2 nm to about 50 nm. Similarly, a mesoporous phosphorus-nitrogen compound may be a periodic mesoporous compound. For example, a mesoporous phosphorus-nitrogen compound may include periodic mesoporous phosphorus(V)-nitride or phosphorus(V)-oxynitride. Additionally, a mesoporous phosphorus-nitrogen compound may include periodic mesoporous phosphorus(V)-oxyimide. Similarly, a mesoporous phosphorus-nitrogen compound may include hexagonal periodic mesoporous phosphorus(V)-oxyimide or cubic periodic mesoporous phosphorus(V)-oxyimide.

In still another embodiment, as described herein, a method of making a mesoporous phosphorus-nitrogen compound includes steps of (1) providing a mesoporous silica template and a polymerizable phosphorus source; (2) combining the mesoporous silica template and the polymerizable phosphorus source; (3) polymerizing the polymerizable phosphorus source under nitridizing conditions; and thereafter (4) isolating at least one mesoporous phosphorus-nitrogen compound. The polymerizable phosphorus source may include phosphorus(V) having, or being capable of forming, at least one P—N covalent bond. For example, the polymerizable phosphorus source may be PNC, $PCl_5$, tetraminophosphazenium, hexaminodiphosphazenium, or a phosphorus-sulfide. Also, the polymerizable phosphorus source may include P(III) or elemental phosphorus, in addition to an oxidizing agent.

In the foregoing method, the polymerizing step may be induced by application of heat. Furthermore, the isolating step may include leaching the silica template to thereby produce at least one isolatable mesoporous phosphorus-nitrogen compound. Also, the leaching step included contacting the mesoporous silica template with an aqueous solution of acetone and hydrofluoric acid.

In still yet another embodiment, provided herein are novel and heretofore unknown compounds including periodic mesoporous phosphorus(V)-oxyimide, periodic mesoporous phosphorus(V)-nitride, and phosphorus(V)-oxynitride. Such compound may have a dielectric constant (k) of less than about 2.0, an elastic modulus of larger the 6 gigapascal, and be thermally stable to at least 400° C. Likewise, such compounds may belong to the hexagonal p6mm or cubic Im3̄m space groups.

The foregoing Detailed Description is further exemplified for the following Examples, which should not be construed as limiting.

EXAMPLES

Chemicals

In the following Examples, the following chemical reagents were used: triblock copolymers $EO_{20}PO_{70}EO_{20}$ "Pluronic P123" and $EO_{106}PO_{70}EO_{106}$ "Pluronic F127" (BASF Corp., USA), tetraethyl orthosilicate ("TEOS," Sigma-Aldrich, Inc.), phosphonitrilic chloride trimer ("PNC") (Alfa Aesar), 48-50% HF in water (Fisher Chemicals), nitrogen (Airgas, Inc) and ammonia (GT & S, Inc.) gas. All the chemicals were used as-received, without further purification. (PLURONIC® is a trademark of BASF Corp., New Jersey).

Synthesis of Mesoporous p6mm Hexagonal Silica (SBA-15)

Mesoporous hexagonal silica SBA-15 was synthesized by using P123 as a structure directing agent and TEOS as silica source. In a typical synthesis, 3.0 g of P123 was dissolved in 114.0 mL of 1.6 M hydrochloric acid. To it, 6.6 g of TEOS was added at 35° C. under stirring with a magnetic stirrer until TEOS was completely dissolved. The mixture was placed in an oven for 24 h at 35° C. for the mesostructure formation, and subsequently for 6 h at 100° C. for hydrothermal treatment. The product was filtered, dried at 100° C. without washing, and then calcined in air at 550° C. for 5 h.

Synthesis of Mesoporous Im3̄m Body Centered Cubic Silica (SBA-16)

In a typical synthesis procedure, 5.0 g of F127 was dissolved in 240 g of distilled water and 10.5 g of hydrochloric acid (35 wt %). To it, 15.5 g of butanol was added at 45° C. After stirring for 1 h, 24 g TEOS was added and the stirring of the mixture was continued for 24 h for the mesostructure formation. The hydrothermal treatment was carried out by aging the mixture for another 24 h in static condition. The product was filtered, dried at 100° C. without washing, and then calcined in air at 550° C. for 5 h. The molar composition of the starting reaction mixture was 0.0035 F127/1 TEOS/1.8 butanol/0.91HCl/117H$_2$O.

Characterization of the Materials

The formation of the mesostructure, study of their textured properties and the compositions were carried out by transmission electron microscopy ("TEM"), small and wide angle X-ray diffraction ("XRD"), nitrogen sorption analysis, Fourier-transform infrared ("FTIR") spectroscopy and elemental analysis. The TEM images were taken on a JEOL JEM-2000 electron microscope operated at 200 kV. Samples for the TEM analysis were prepared by dispersing the particles in an organic solvent and dropping a small volume of it onto a carbon-coated copper grid. Energy dispersive X-ray analysis ("EDS") of samples was carried out using Oxford ISIS EDS with a light element detector. The ordered mesostructure of the specimen was determined by small angle XRD patterns using a Rigaku Rotaflex diffractometer with a Cu Kα radiation source ($\lambda$=0.15405 nm). Nitrogen sorption isotherms were measured at −196° C. with an Autosorb-1 analyzer (Quantachrome). Before measurements, the samples were degassed in vacuum at 150° C. overnight. The Brunauer-Emmett-Teller ("BET") method was used to calculate the specific surface areas. FTIR spectra were collected on Thermo Mattson Satellite FTIR spectrometer, using KBr pellets. Elemental analysis of selected samples was carried out by Fa. Pascher (Remagen, Germany). The characteristics and properties of the periodic mesoporous phosphorus-nitrogen compounds are discussed hereinabove.

While this description is made with reference to exemplary embodiments, it will be understood by those skilled in the art that various changes may be made and equivalents may be substituted for elements thereof without departing from the scope. In addition, many modifications may be made to adapt a particular situation or material to the teachings hereof without departing from the essential scope. Also, in the Drawings and the description, there have been disclosed exemplary embodiments and, although specific terms may have been employed, they are unless otherwise stated used in a generic and descriptive sense only and not for purposes of limitation, the scope of the claims therefore not being so limited. Moreover, one skilled in the art will appreciate that certain steps of the methods discussed herein may be sequenced in alternative order or steps may be combined. Therefore, it is intended that the appended Claims not be limited to the particular embodiment disclosed herein.

The invention claimed is:

1. A composition comprising mesoporous phosphorus-oxyimide.

2. The composition according to claim 1, wherein the mesoporous phosphorus-oxyimide is mesoporous phosphorus(V)-oxyimide.

3. The composition according to claim 1, wherein the mesoporous phosphorus-oxyimide is mesoporous phosphorus(III)-oxyimide.

4. A method of making mesoporous phosphorus-oxyimide comprising steps of
   providing a mesoporous silica template and a polymerizable phosphorus source;
   combining the mesoporous silica template and the polymerizable phosphorus source;
   polymerizing the polymerizable phosphorus source under nitridizing conditions; and thereafter
   isolating mesoporous phosphorus-oxyimide.

5. The method according to claim 4, wherein the polymerizable phosphorus source comprises phosphorus(V) and has, or is capable of forming, at least one P—N covalent bond.

6. The method according to claim 4, wherein the polymerizable phosphorus source is PNC, PCl$_5$, tetraaminophosphazenium, hexaaminodiphosphazenium, or a phosphorus-sulfide.

7. The method according to claim 4, wherein the polymerizable phosphorus source comprises P(III) or elemental phosphorus, in addition to an oxidizing agent.

8. The method according to claim 4, wherein the polymerizing step is induced by application of heat.

9. The method according to claim 4, wherein the isolating step includes leaching the silica template to thereby produce at least one isolatable polymeric mesoporous phosphorus-nitrogen compound.

10. The method according to claim 9, wherein the leaching step comprises contacting the mesoporous silica template with an aqueous solution of acetone and hydrofluoric acid.

11. The method according to claim 4, wherein the mesoporous phosphorus-oxyimide is mesoporous phosphorus(V)-oxyimide.

12. The method according to claim 4, wherein the mesoporous phosphorus-oxyimide is mesoporous phosphorus(III)-oxyimide.

13. The compound mesoporous phosphorus-oxyimide.

14. The compound according to claim 13, wherein the compound has a dielectric constant (k) of less than about 2.0, an elastic modulus of larger than 6 gigapascal, and wherein the compound is thermally stable to at least 400° C.

15. The compound according to claim 13, wherein the compound belongs to the hexagonal p6mm or cubic Im3̄m space group.

16. The compound according to claim 13, wherein the phosphorus is phosphorus(V).

17. The compound according to claim 13, wherein the phosphorus is phosphorus(III).

* * * * *